April 29, 1969 E. N. SCHWARTZ 3,441,917

DRIVE ARRANGEMENT FOR MEMORY DEVICE

Filed Dec. 23, 1964

INVENTOR
EDWARD N. SCHWARTZ

BY Rene A. Kuypers

ATTORNEY

United States Patent Office 3,441,917

Patented Apr. 29, 1969

3,441,917
DRIVE ARRANGEMENT FOR MEMORY DEVICE

Edward N. Schwartz, Philadelphia, Pa., assignor to Sperry Rand Corporation, New York, N.Y., a corporation of Delaware Filed Dec. 23, 1964, Ser. No. 420,528

Int. Cl. G11b *5/00*

U.S. Cl. 340—174 7 Claims

ABSTRACT OF THE DISCLOSURE

This invention comprises reading-out the information stored in a memory location by utilizing the fast trailing rather than the slow leading edge of the interrogation pulse applied to an associated drive line. The trailing edge is generated as a function of the inductance and distributive capacity of the drive line whereas the leading edge is a function of the above-named parameters as well as the impedance of the driving source.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to the sensing of information in a memory device. This invention relates in particular to a low power technique for sensing information in a digital memory.

It is recognized that the magnitude of the output signal produced by a thin, film memory element, whether of the planar or plated wire type, is a function of how rapidly the film's magnetic moment is switched or rotated by a drive signal. In other words, the output voltage is a function of $d\phi/dt$ or the rate of change of flux with respect to time produced by the film's magnetic moment.

It is also recognized that the speed with which a thin film's magnetic moment is rotated is determined by the rise time of the drive pulse. The faster the rise time, the more rapid the switching; similarly, the slower the rise time of the drive pulse the slower the switching.

However, in order to increase the rise time of a drive signal there must be a corresponding increase of the power supplied by the driving source coupled to the drive line. The high power requirement for a fast rise time drive pulse is a recognized prior art shortcoming and is often undesirable in many applications.

Accordingly, it is an object of this invention to provide a new and improved memory sensing technique.

It is another object of this invention to provide a new and improved sensing technique which utilizes a minimum of power.

It is a further object of this invention to provide a new and improved memory sensing technique which achieves rapid switching at a low power level.

It is still a further object of this invention to provide a new and improved memory sensing technique which is relatively simple and economical to fabricate.

In accordance with a feature of this invention, there is provided a technique for sensing information stored in a thin film memory element which comprises utilizing the trailing edge rather than the leading edge of a drive signal. By sensing information on the trailing edge of the drive signal, the need for a drive signal having a fast rise time leading edge does not arise. By eliminating the fast rise time requirement, the power applied to the drive line can be materially reduced.

Figure 2:
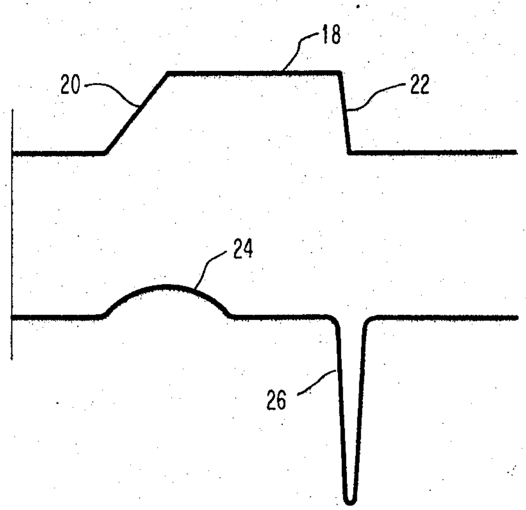

The novel features that are considered characteristic of this invention are set forth with particularity in the appended claims. The invention itself, however, both as to its organization and method of operation, as well as additional objects and advantages thereof, will best be understood from the following description considered in conjunction with the accompanying drawing, wherein, FIGURE 1 depicts a magnetizable plated wire memory element with its associated circuitry shown in block form;

FIGURE 2 depicts the drive signal applied to the drive line and the resultant read-out signals induced in the associated sense line.

Figure 1:
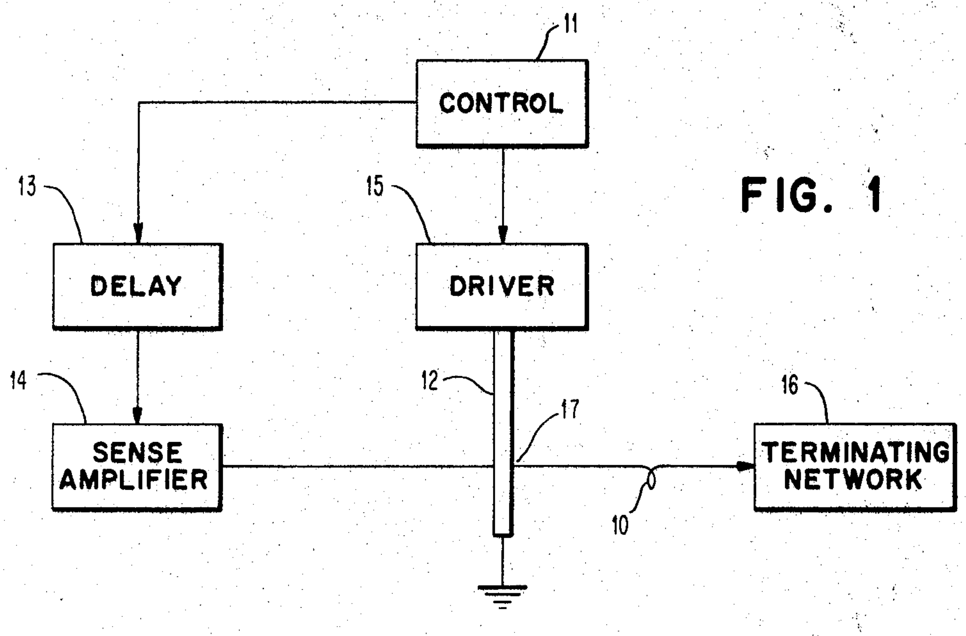

Referring now to drawings and in particular to FIGURE 1, there is depicted a magnetizable plated wire 10 comprising a five mil diameter beryllium copper substrate. The substrate is coated with approximately a 10,000 Angstrom thickness of a nickel-iron alloy (80% nickel=20% iron) by means of an electroplating technique. The alloy coating is electroplated in the presence of a circumferential magnetic field that establishes a uniaxial anisotropy axis at right angles (i.e., around the circumference) to the length of the substrate. The uniaxial anisotropy establishes a preferred axis of magnetization (i.e., an easy direction of magnetization). The magnetic moment of the film is oriented in one of the two equilibrium positions along the easy axis, thereby establishing two bistable states necessary for binary logic applications.

Placed substantial orthogonal to the plated wire 10 is the drive line 12 which comprises a narrow metal strap several mils wide. One end of the drive line 12 is connected to ground potential and the other end is connected to the driver 15. The driver 15 conventionally comprises a current source such as a transistor device together with its associated circuitry. The combination of the plated wire 10 and the drive line 12 comprises or defines the memory element of this invention and the intersection 17 of the two components is conventionally termed a bit or a bit position. In other words, the intersection 17 comprising the plated wire 10 and the drive line 12 is a memory element which can store either a binary zero or a binary one.

Connected at one end of the plated wire 10 is the sense amplifier 14 and at the other end there is connected the terminating network 16. As understood in the art, the sense amplifier determines whether a binary one or zero is stored in the bit position 15 when a signal is induced in the plated wire 10 (i.e., the plated wire operates as a sense line) during a memory read-out cycle. The terminating network 16 is normally an impedance matched to the impedance of the line, in which case, the read-out signal is dissipated therein. If the terminating network is at ground potential, the induced signal is phase inverted and reflected back to the sense amplifier 14 in phase with the signal that emanated from the bit position 15 directed to the left. This is in accordance with well known transmission line principles.

The driver 15 is conditioned or energized by the control 11 which causes the driver 15 to provide current for the drive line 12. The con trol 11 is also connected to the sense amplifier 14 via the delay element 13. The reason for the delay element 13 will be discussed hereinafter in greater detail.

Assume that it now required to read-out the binary information stored in the bit position 15. The driver 15 is energized by the control 11 so that current flows in the drive line 12 to ground. In accordance with Ampere's law, the current produces a magnetizing force which rotates the magnetic moment of the thin film from the easy toward the hard axis of magnetization at some angle less than 90 degrees. The drive signal 18 applied to the drive line 12 by the driver 15 is shown in FIGURE 2. It will be noted that the drive signal 18 has a leading edge 20 whose rise time is much slower than the fall time of its trailing edge 22 in accordance with this invention. The leading edge 20 of the drive signal 18 causes a rotation of the thin film's magnetic moment to some angle less than 90 degrees thereby inducing the signal 24 in the plated wire 10 (i.e., in the sense line). Similarly, the trailing edge 22 of the drive signal 18 induces the negative signal 26 in the plated wire 10 by rotating the film's magnetic moment back to the preferred or easy axis. It is to be noted that the area under signals 24 and 26 are the same (i.e., the volt-seconds of signal 24 is the same as the volt-seconds of signal 26).

The leading edge 20 of the read-out pulse 18 is conventionally designed in prior art techniques to have a very fast rise time in order that the magnetic moment of the thin film element can be switched rapidly, as discussed above. However, in order to achieve a fast rise time signal for read-out purposes, a large amount of power must be produced by the current source (i.e., normally a transistor device). In other words, the rise time of the read-out current is a function of the magnitude of the voltage impressed across the drive line by the transistor driving circuit. Therefore, in order to develop a fast rise at the leading edge 20 for read-out purposes, a large amount of power must be produced by the driver 15.

In accordance with this invention, the induced read-out voltage 24 produced by the leading edge 20 of the read-out signal 18 is not utilized and therefor the requirement for a rapid rise time leading edge 20 as well as the higher power requirement is eliminated for the reasons discussed below.

The time required to develop the trailing edge 22 of the read-out signal 18 is independent of the amount of power expended in the drive line 12. The reason for this is the fall time of the trailing edge 22 is a function of the drive line 12 parameters only (i.e., the distributive capacitance of the drive line), provided that the current source turns off quickly compared to the desired fall time. This is to be contrasted with the rise time, which is not only a function of the drive line parameters including the inductance and distributive capacitance of the line 12 but also the impedance of the drive source. In other words, the higher the source impedance for a given current, the higher the voltage of the source.

The above discussion may be explained in yet another way. As mentioned above, the rise time of the leading edge 20 of the read signal 18 is a function of the voltage. The higher the voltage across the drive line 12, the faster the current will rise. On the other hand, the fall time is very rapid since by simply opening the driver circuit or current source quickly compared to the fall time, the dissipation of the current or energy stored in the inductive load is a function only of how rapidly the current discharges through the capacitance. This is rapid since the discharge is rapid and hence, the fall time is rapid.

In order for the sense amplifier to detect the read-out signal 26 during the trailing edge 22 of the read-out signal 18, the control circuit 11 energizes the sense amplifier 14 a short period of time after the driver 15 has been energized. For this reason, the sense amplifier 14 will not detect the read-out pulse 24 but rather will detect the pulse 26.

Many important advantages flow from the subject invention. Thus, since the power requirements of the drive circuit can be lowered, the accompanying circuitry can be designed more economically and simply.

Furthermore, by reading-out information on the trailing edge 22 of the read-out signal 18, any overshoot on the leading edge 20 will not produce destructive read-out stored in the memory element as is sometimes the case when reading on the leading edge.

In summary, this invention relates to a technique for reading-out information stored in a memory element by utilizing the trailing edge rather than the leading edge of a drive signal. As a consequence, the driving circuitry can be materialy reduced in its power requirement and simplified in its design.

Obviously many modifications and variations of the present invention are possible in the light of the above teachings. It is therefor to be understood that within the scope of the appended claims, the invention may be practiced otherwise than is specifically described.

The embodiments of the invention in which an exclusive property or privilege is claimed are defined as follows:

1. A memory element having two states of stable magnetic remanence, said two states of remanence comprising first and second recorded signals; drive means juxtaposed to said memory element to interrogate it with a signal having a leading and trailing edge, said trailing edge being faster in time than said leading edge; sense means coupled to said memory element to detect the information stored in said memory element during the trailing edge of said signal to determine whether said first or second signal is recorded in said memory element.

2. A plated magnetic wire having two states of stable magnetic remanence, said two states of remanence comprising first and second recorded signals; a drive line, which is adapted to be connected to an energizing signal, positioned substantially orthogonal and in juxtaposition to said plated magnetic wire, said signal interrogating said plated wire by means of said drive line during the leading and trailing edge of said signal, said trailing edge being faster than said leading edge; sense means connected to said plated magnetic wire to determine during the trailing edge of said signal whether said first or second signal is recorded on said plated wire.

3. A memory element having two states of stable magnetic remanence, said two states of remanence comprising first and second recorded signals; means producing a drive signal which is coupled to said memory element to interrogate said element during the leading and trailing edge of said signal, said trailing edge being faster than said leading edge; sense means coupled to said memory element; means connected to sense means to detect said recorded signals during the trailing edge of said drive signal.

4. A plated magnetic wire having two states of stable magnetic remanence, said two states of remanence comprising first and second recorded signals; a drive line, which is adapted to be connected to an energizing means, positioned substantially orthogonal and in juxtaposition to said plated magnetic wire, said energizing means producing a signal to interrogate said plated wire during the leading and trailing edge thereof, said trailing edge being faster than said leading edge; sense means connected to said plated magnetic wire; means to condition said sense amplifier for detecting said recorded signal only during the trailing edge of said signal.

5. A plated magnetic wire having a magnetic coating with the property of uniaxial anisotropy, said coating having an EASY axis which is circumferential and a HARD axis which is longitudinal, a first or second recorded signal being determined by whether the magnetization vectors are oriented in a clockwise or counterclockwise respective direction along said EASY direction; drive means juxtaposed to said wire to rotate the magnetization vectors with a signal such that said vectors are rotated slowly toward said HARD axis and are returned to said EASY axis quickly; sense means coupled to said plated wire to detect said first or second signal induced in said wire during the time period when said vectors are being returned to said EASY axis.

6. The combination in accordance with claim 5 wherein said wire comprises a 5 mil diameter beryllium-copper substrate.

7. The combination in acordance with claim 6 wherein said magnetic coating comprises a 10,000 angstrom thickness of Permalloy.

References Cited

UNITED STATES PATENTS

| | | | |
|---|---|---|---|
| 3,278,914 | 10/1966 | Rashleigh et al. | 340—174 |
| 3,355,726 | 11/1967 | Koerner | 340—174 |
| 3,189,879 | 6/1965 | MacIntyre et al. | 340—174 |
| 3,219,985 | 11/1965 | MacIntyre | 340—174 |

BERNARD KONICK, *Primary Examiner.*

J. F. BREIMAYER, *Assistant Examiner.*